United States Patent
Lei et al.

(10) Patent No.: US 11,991,690 B2
(45) Date of Patent: May 21, 2024

(54) METHOD AND APPARATUS FOR FLEXIBLE TRANSMISSION ON UNLICENSED SPECTRUM

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 75 days.

(21) Appl. No.: 17/273,896

(22) PCT Filed: Sep. 7, 2018

(86) PCT No.: PCT/CN2018/104633
§ 371 (c)(1),
(2) Date: Mar. 5, 2021

(87) PCT Pub. No.: WO2020/047851
PCT Pub. Date: Mar. 12, 2020

(65) Prior Publication Data
US 2021/0243781 A1    Aug. 5, 2021

(51) Int. Cl.
*H04W 72/00*   (2023.01)
*H04L 5/00*    (2006.01)
(Continued)

(52) U.S. Cl.
CPC ....... *H04W 72/1268* (2013.01); *H04L 5/0051* (2013.01); *H04W 72/0446* (2013.01);
(Continued)

(58) Field of Classification Search
None
See application file for complete search history.

(56) References Cited

U.S. PATENT DOCUMENTS

2017/0041805 A1   2/2017  Chandrasekhar et al.
2019/0029046 A1*  1/2019  Li ................. H04W 72/0446
(Continued)

FOREIGN PATENT DOCUMENTS

| CN | 107318171 A | 11/2017 |
| CN | 108029023 A | 5/2018 |
| WO | 2017120542 A1 | 7/2017 |

OTHER PUBLICATIONS

International Searching Authority, "Notification of Transmittal of the International Search Report and the Written Opinion of the International Searching Authority, or the Declaration", PCT/CN2018/104633, dated Sep. 7, 2018, pp. 1-7.

*Primary Examiner* — Brandon M Renner
(74) *Attorney, Agent, or Firm* — Kunzler Bean & Adamson

(57) ABSTRACT

The present application relates to method and apparatus for flexible uplink transmission on unlicensed spectrum. One embodiment of the present disclosure provides an apparatus comprising: a receiver that receives an uplink grant for scheduling uplink transmission; a processor that: determines, based on the uplink grant, at least one candidate starting position in a scheduled time slot for the uplink transmission, wherein a candidate starting position, among the at least one candidate starting position, is determined based on a location of a Demodulation Reference Signal (DMRS) symbol; and determines a starting position for the uplink transmission from the at least one candidate starting position based on a result of performing a listen before talk (LBT) procedure on the scheduled time slot; and a transmitter that starts the uplink transmission in the scheduled time slot from the determined starting position.

20 Claims, 6 Drawing Sheets

(51) Int. Cl.
*H04W 72/0446* (2023.01)
*H04W 72/1268* (2023.01)
*H04W 72/23* (2023.01)
*H04W 72/50* (2023.01)
*H04W 74/0816* (2024.01)

(52) U.S. Cl.
CPC ......... *H04W 72/23* (2023.01); *H04W 72/535* (2023.01); *H04W 74/0816* (2013.01)

(56) References Cited

U.S. PATENT DOCUMENTS

| | | | |
|---|---|---|---|
| 2019/0208537 A1* | 7/2019 | Ke | H04W 74/04 |
| 2019/0268934 A1* | 8/2019 | Korhonen | H04W 72/1268 |
| 2019/0327117 A1* | 10/2019 | Jeon | H04L 5/0094 |
| 2020/0068566 A1* | 2/2020 | Gao | H04W 72/0446 |
| 2020/0092047 A1* | 3/2020 | Yeo | H04L 1/0061 |
| 2020/0112403 A1* | 4/2020 | Liu | H04L 5/0055 |
| 2020/0137780 A1* | 4/2020 | Kim | H04L 5/0082 |
| 2020/0177341 A1* | 6/2020 | Li | H04L 5/0053 |
| 2020/0344010 A1* | 10/2020 | Lei | H04L 1/1861 |
| 2021/0076371 A1* | 3/2021 | Bhamri | H04W 64/006 |
| 2021/0167900 A1* | 6/2021 | Karaki | H04L 1/1822 |
| 2021/0250142 A1* | 8/2021 | Wang | H04L 5/0055 |

\* cited by examiner

METHOD AND APPARATUS FOR FLEXIBLE TRANSMISSION ON UNLICENSED SPECTRUM

TECHNICAL FIELD

The present disclosure generally relates to a method and apparatus for communication, and especially to a method and apparatus for communication with 3GPP 5G new radio (NR) access on unlicensed spectrum (NR-U).

BACKGROUND OF THE INVENTION

Listen Before Talk or sometimes called Listen Before Transmit (LBT) is a technique used for transmission on unlicensed spectrum. In order to achieve fair coexistence with other wireless systems, LBT is required before a transmitter can start the transmission on unlicensed spectrum. LBT is performed by performing energy detection on a certain channel. If the detected power of the channel is below a predefined threshold, LBT is successful, which suggests that the channel is deemed as empty and available for transmission. Only when LBT is successful, can the transmitter start the transmission on the channel and occupy the channel up to the maximum channel occupancy time (MCOT); otherwise, the transmitter cannot start the transmission and will continue to perform LBT until a successful LBT.

As can be seen, the result of LBT is unpredictable, and due to this unpredictability, the transmitter cannot determine when the channel is available for transmission. Therefore, the transmitter has to prepare multiple data versions corresponding to multiple candidate starting positions before transmission so that it can transmit the data as soon as LBT is successful. Correspondingly, the receiver has to blind detect the multiple candidate starting positions so that it does not miss the potential transmission from the transmitter. The unpredictability of LBT causes high implementation complexity for both the transmitter and the receiver on unlicensed spectrum.

Accordingly, fully utilizing unlicensed spectrum with multiple candidate starting positions leads to high blind detection effort and high power consumption of the receiver; it also leads to more complicated implementation of the transmitter in order to prepare multiple versions of data.

It is advantageous to reduce the blind detection effort by helping the receiver identify the actual starting position of the data transmission and reduce the impact on channel estimation.

BRIEF SUMMARY OF THE INVENTION

One embodiment of the present disclosure provides an apparatus comprising: a receiver that receives an uplink grant for scheduling uplink transmission; a processor that determines, based on the uplink grant, at least one candidate starting position in a scheduled time slot for the uplink transmission, wherein a candidate starting position, among the at least one candidate starting position, is determined based on a location of a Demodulation Reference Signal (DMRS) symbol, and also determines a starting position for the uplink transmission from the at least one candidate starting position based on a result of performing an LBT procedure in the scheduled time slot; and a transmitter that starts the uplink transmission in the scheduled time slot from the determined starting position.

Another embodiment of the present disclosure provides an apparatus comprising: a transmitter that transmits an uplink grant for scheduling uplink transmission; a processor that determines, based on the uplink grant, at least one candidate starting position in a scheduled time slot for the uplink transmission, wherein a candidate starting position, among the at least one candidate starting position, is determined based on a location of a Demodulation Reference Signal (DMRS) symbol, and also determines, in the scheduled time slot, a starting position of the uplink transmission from the at least one candidate starting position; and a receiver that receives the uplink transmission in the scheduled time slot from the determined starting position.

Yet another embodiment of the present disclosure provides a method comprising: receiving an uplink grant for scheduling uplink transmission; determining, based on the uplink grant, at least one candidate starting position in a scheduled time slot for the uplink transmission, wherein a candidate starting position, among the at least one candidate starting position, is determined based on a location of a DMRS symbol; and determining a starting position for the uplink transmission from the at least one candidate starting position based on a result of performing an LBT procedure in the scheduled time slot; and starting the uplink transmission in the scheduled time slot from the determined starting position.

Yet another embodiment of the present disclosure provides a method comprising: transmitting an uplink grant for scheduling uplink transmission; determining, based on the uplink grant, at least one candidate starting position in a scheduled time slot for the uplink transmission, wherein a candidate starting position, among the at least one candidate starting position, is determined based on a location of a DMRS symbol; and determining, in the scheduled time slot, a starting position of the uplink transmission from the at least one candidate starting position; and receiving the uplink transmission in the scheduled time slot from the determined starting position.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for flexible uplink transmission on unlicensed spectrum. To facilitate understanding, embodiments are provided under specific network architecture and new service scenarios, such as 3GPP 5G, 3GPP Long Term Evolution (LTE) Release 8 and so on. Persons skilled in the art know very well that, with the development of network architecture and new service scenarios, the embodiments in the present disclosure are also applicable to similar technical problems.

Figure 1:
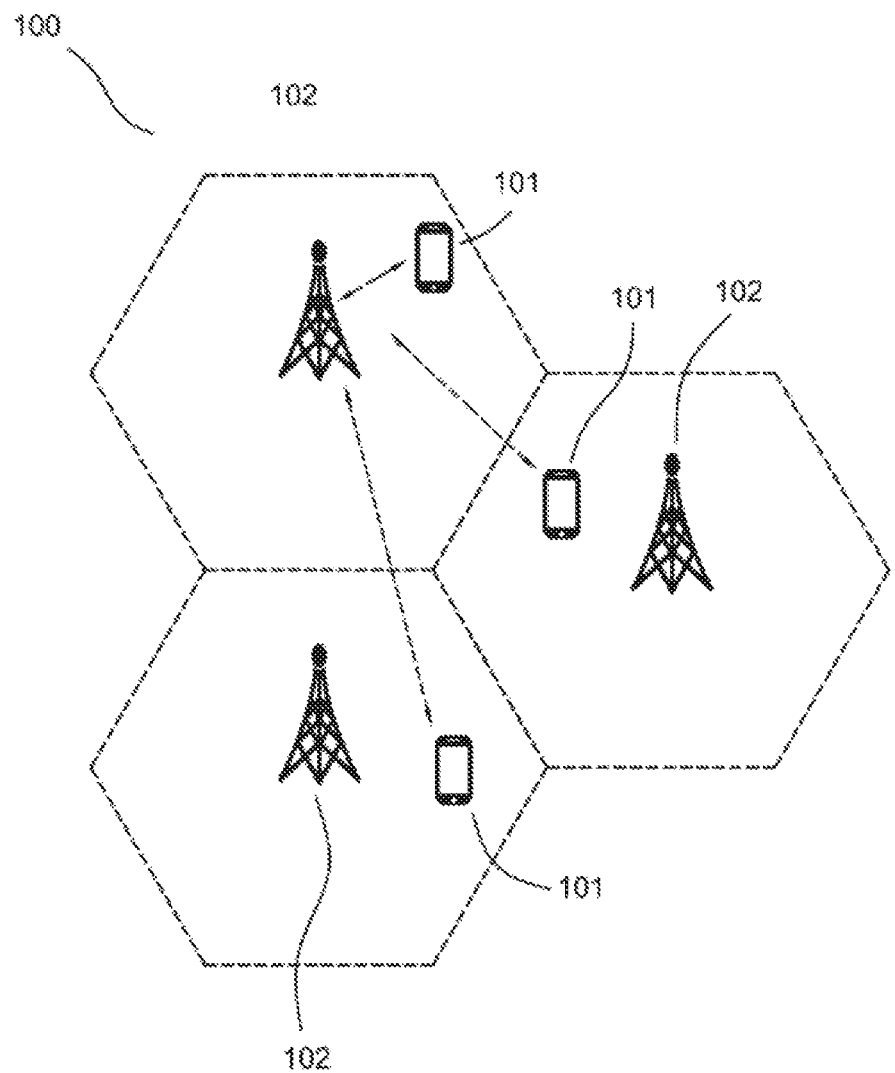
FIG. 1 illustrates an example block diagram of a wireless communication system according to an embodiment of the present disclosure.

FIG. 1 depicts a wireless communicator system 100 according to an embodiment of the present disclosure.

As shown in FIG. 1, the wireless communication system 100 includes a UE 101 and base stations 102. Even though a specific number of UEs 101 and base stations 102 are depicted in FIG. 1, one skilled in the art will recognize that any number of UEs 101 and base stations 102 may be included in the wireless communication system 100.

The LE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101 includes wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with a base station 102 via uplink (UL) communication signals.

The base stations 102 may be distributed over a geographic region. In certain embodiments, a base station 102 may also be referred to as an access point, an access terminal, a base, a base station, a macro cell, a Node-B, an enhanced Node B (eNB), a Home Node-B, a relay node, or a device, or described using other terminology used in the art. The base stations 102 are generally part of a radio access network that may include one or more controllers communicably coupled to one or more corresponding base stations 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the base station 102 transmits data using an orthogonal frequency division multiplexing (OFDM) modulation scheme on the DL and the UE 101 transmits data on the UL using a single-carrier frequency division multiple access (SC-FDMA) or OFDM scheme. More generally, however, the wireless communication system 100 may implement some other open or proprietary communication protocols, for example, WiMAX, among other protocols.

In other embodiments, the base station 102 may communicate using other communication protocols, such as the IEEE 802.11 family of wireless communication protocols. Further, in some embodiments, the base station 102 may communicate over licensed spectrum, whereas in other embodiments the base station 102 may communicate over unlicensed spectrum. The present disclosure is not intended to be limited to the implementation of any particular wireless communication system architecture or protocol. In another embodiment, the base station 102 may communicate with the UE 101 using the 3GPP 5G protocols.

In Rel-13 LTE Licensed. Assisted Access (LAA), if Radio Resource Control (RRC) signalling configures both symbols 0 and 7 to the UE, the candidate starting positions for downlink transmission include symbols 0 and 7; otherwise, the candidate starting positions include only symbol 0. There are two reasons why only one or two candidate starting positions are allowed: (1) to simplify the implementation complexity of the base station for DL data preparation; and (2) to reduce blind detection effort of the UE for candidate DL Physical Downlink Control Channel (PDCCH) monitoring.

In Rel-15 LTE Further Enhanced LAA (FeLAA), the candidate starting positions for uplink transmission include symbols 0 and 7. In order to simplify UE implementation, a full subframe Physical Uplink Shared Channel (PUSCH) is prepared by the UE regardless of when the UE can start its PUSCH transmission in the subframe. The first slot of the subframe will be punctured if the UE fails to grab the channel from symbol 0 but occupies the channel from symbol 7. In this way, only the second slot of the subframe is used for PUSCH transmission. However, from the perspective of channel utilization efficiency, only two candidate starting positions for both DL and UL lead to low channel utilization efficiency.

In NR, the candidate starting positions are more flexible. Regarding DL/UL, scheduling and Hybrid Automatic Repeat Request (HARQ), NR can support both slot-based transmission and mini-slot based transmission. Multiple flexible starting positions and ending positions for Physical Downlink Shared Channel (PDSCH) transmission and PUSCH transmission are defined in 3GPP TS 38.214. The corresponding starting positions and durations for PDSCH type A/B and PUSCH type A/B are listed in the following two tables (Table 1 and Table Inch can be found in 3GPP TS 38.214.

TABLE 1

Valid Starting (S) and Length (L) combinations

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} | {3, ..., 14} | {3, ..., 14} | {0, 1, 2, 3} | {3, ..., 12} | {3, ..., 12} |
| Type B | {0, ..., 12} | {2, 4, 7} | {2, ..., 14} | {0, ..., 10} | {2, 4, 6} | {2, ..., 12} |

TABLE 2

Valid S and L combinations

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

Based on the starting positions and durations defined for normal cyclic prefix (CP), PDSCH mapping type A has up to four candidate starting positions (i.e., symbols 0, 1, 2 and 3) and 12 candidate ending positions (i.e., symbols 2, 3, ..., 13); PDSCH mapping type B has up to 13 candidate starting positions and 12 candidate ending positions (i.e., symbols 2, 3, ..., 13); PUSCH mapping type A has only one starting position and up to 11 ending positions; PUSCH mapping type B has up to 14 candidate starting positions and 14 candidate ending positions. The detailed values are listed in Table 3 below. It is noted that the maximum ending position is symbol 13, and thus one PDSCH or PUSCH transmission is guaranteed within the slot boundary.

TABLE 3

Candidate starting positions and ending positions for normal cyclic prefix

| | Starting positions | Ending positions |
|---|---|---|
| PDSCH mapping Type A | {0, 1, 2, 3} | {2, 3, ..., 13} |
| PDSCH mapping Type B | {0, 1, ..., 12} | {2, 3, ..., 13} |
| PUSCH mapping Type A | {0} | {3, 4, ..., 13} |
| PUSCH mapping Type B | {0, 1, ..., 13} | {0, 1, ..., 13} |

Therefore, with the multiple starting positions and ending positions for NR PDSCH/PUSCH, the mini-slot based PUSCH and PUSCH provide high flexibility for starting and ending positions. This flexibility enables immediate NR DL/UL access to unlicensed spectrum when the channel is sensed to be available. Compared with LTE LAA/eLAA, NR-based DL/UL transmission improves the channel utilization efficiency.

However, fully utilizing unlicensed spectrum with multiple starting positions lead to high blind detection effort and high power consumption of the receiver as well as more complicated implementation of the transmitter required to prepare multiple PDSCHs/PUSCHs subject to LBT.

For NR PUSCH transmission, uplink grant indicates the specific time domain resource allocation pattern. Based on the uplink grant, the UE can derive the scheduled slot, and starting symbol and duration of the scheduled slot. However, the base station cannot predict the actual starting position of the PUSCH because the starting position is dependent on the LBT result at the UE side. To support multiple UL starting positions, the LIE first prepare the PUSCH according to the uplink grant, for example, determine the PUSCH starting position and duration, and then transmit incomplete PUSCH starting from next nearest candidate starting position as soon as LBT is successful.

In Rel-15 LTE FeLAA, a UE may start uplink data transmission from the first or second slot boundary in a scheduled subframe depending on whether the LBT is successful. When the transmission starts from the second slot, the first slot of a subframe is punctured. This approach can be a baseline for supporting flexible UL starting position for Rel-16 NR-U. The data punctured due to failure of LBT could be recovered by Code Block Group-based (CBG-based) retransmission.

One objective of the present disclosure is to assist the base unit to identify the actual starting position of the PUSCH and how to reduce the impact on channel estimation. In FeLAA, there is one DIVERS in each slot. By detecting the DMRS in each slot, the base station can identify whether the first slot is transmitted or not. The channel is estimated by the DMRS in each slot.

In NR, due to the front-loaded design, the first DMRS is located in the first scheduled symbol(s) for PUSCH mapping type B, but is in the second or the third symbol of a slot for PUSCH mapping type A. For PUSCH mapping type A, the first DMRS is always used for UE identification and channel estimation. If the candidate starting position is later than the first DRMS symbol, the DMRS will be punctured. In that case, it will not only result in a negative impact on channel estimation or even no DMRS for channel estimation in the case of no configuration of additional DMRS, but will also cause complex blind detection of the starting position at the base station. Therefore, solutions are needed to solve the problems of PUSCH identification and channel estimation when DMRS is punctured.

The present invention provides solutions to solve the above problems.

During a NR PUSCH transmission, the base station sends uplink grant to the UE to schedule the uplink transmission. Uplink grant indicates the specific time domain resource allocation pattern, and includes an M-bit code block group transmission information (CBGTI) only for the first time slot of the plurality of time slots, wherein M is a configured maximum number of CBGs per transport block (TB). Upon receiving the uplink grant, the LIE can derive a scheduled slot, and the starting symbol and the duration of the scheduled slot. In some embodiments of the present invention, the candidate starting position(s) in the scheduled time slot is(are) determined based on the location of the DMRS symbol(s). Such rule is aware by both the UE and the base station. Correspondingly, the base station determines a starting position of the uplink transmission based on detecting the existence of DMRS in the symbols assigned to the DMRS, rather than performing blind detection on the unlicensed spectrum. The UE performs the LBT in the time slot scheduled by the uplink grant. Once the LBT is successful, the UE may start transmitting reservation signal to occupy the channel, and transmitting the uplink data from the next nearest candidate starting position in the scheduled time slot. For example, the candidate starting positions include symbols 0 and 4, if the LBT is successful in symbol 1, the UE could transmit the uplink data from symbol 4.

For the PUSCH scheduled by uplink grant, multiple symbols within the scheduled time slot for transmitting PUSCH are divided into several symbol groups (SG). In some embodiments, the starting symbols of the symbol groups are determined to be the candidate starting positions. The number of symbol groups depends on the number of DMRS symbols in the scheduled slot, since a starting symbol of a symbol group is determined by the DMRS in the symbol group. Each symbol group may have a different number of symbols, which is dependent on the DMRS configuration, transmission duration and the actual DMRS symbol positions.

FIGS. 2(a)-2(d) depict several DMRS configurations according to the present disclosure.

Figure 2A:
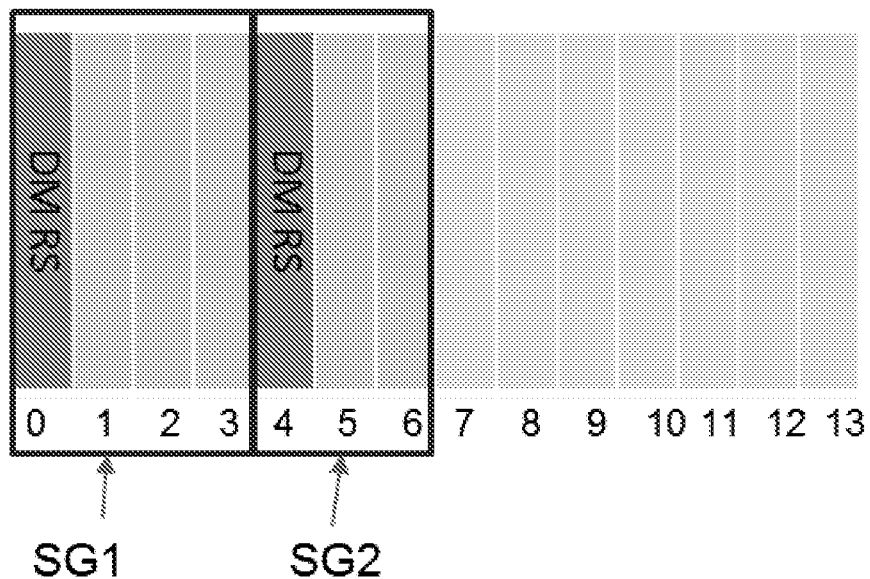
FIGS. 2(a)-2(d) illustrate several DMRS configurations according to the present disclosure.

FIG. 2(a) shows that one additional DMRS is configured for PUSCH mapping type B. That is, there are two DMRSs configured for PUSCH mapping type B. Symbol 0 to symbol 6 for PUSCH are assigned for the uplink transmission and are divided into two symbol groups (SG1 and SG2). SG1 consists of symbols 0, 1, 2 and 3, and SG2 consists of symbols 4, 5 and 6, where the symbol index is relative to the first assigned symbol. The positions of the DMRS are symbols 0 and 4. In the present embodiment, the candidate starting positions are the symbol positions of the DMRS symbols. In other words, in FIG. 2(a), the candidate starting positions are symbols 0 and 4.

Figure 2B:
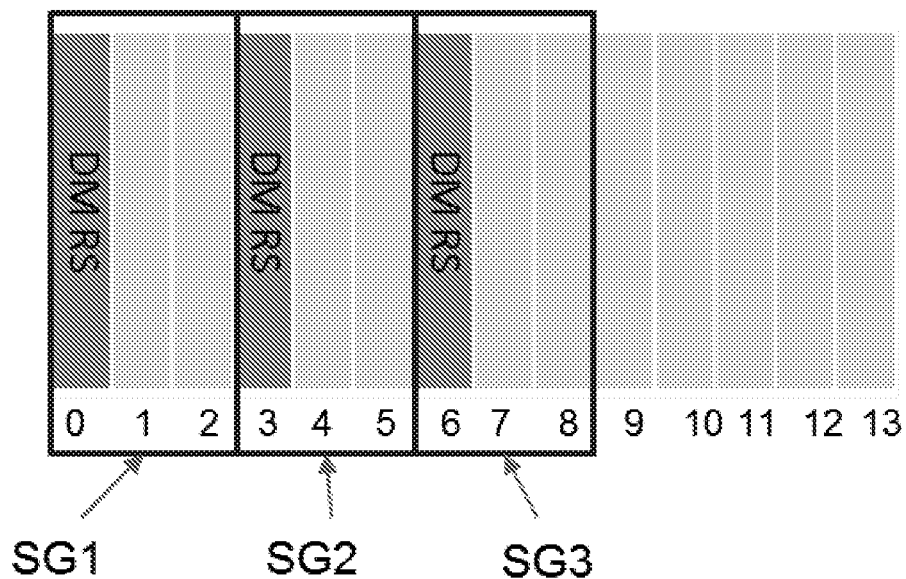

FIG. 2(b) shows three DMRSs configured for PUSCH mapping type B. Symbol 0 to symbol 8 for PUSCH are assigned for the uplink transmission and are divided into three symbol groups (SG1, SG2, and SG3). SG1 consists of symbols 0, 1, and 2, SG2 consists of symbols 3, 4, and 5, and SG3 consists of symbols 6, 7, and 8, where the symbol index is relative to the first assigned symbol. The positions of the DMRSs are symbols 0, 3, and 6 re, and the candidate starting positions are symbols 0, 3, and 6 in the present embodiment.

Figure 2C:
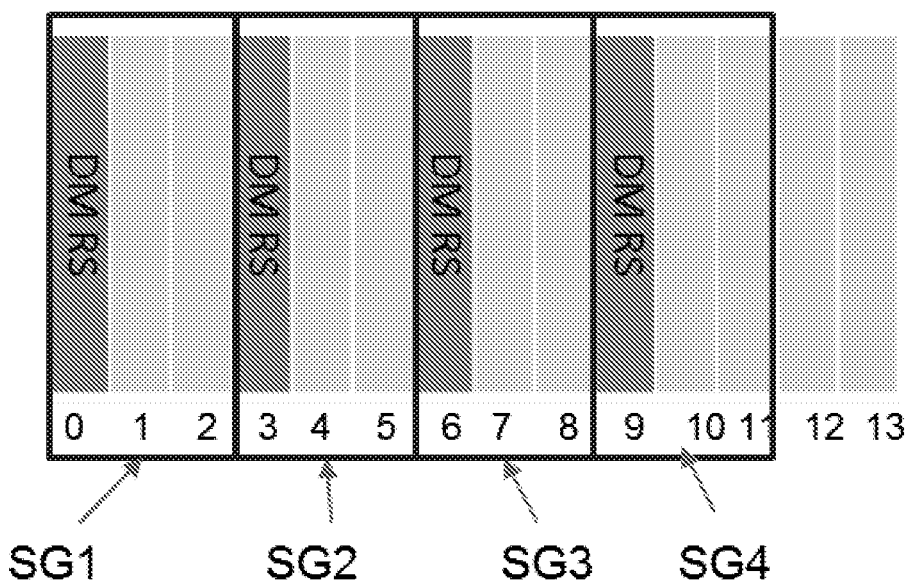

FIG. 2(c) shows four DMRSs configured for PUSCH mapping type B. Symbol 0 to symbol 11 for PUSCH are assigned for the uplink transmission and are divided into four SGs (SG1, SG2, SG3, and SG4). SG1 consists of symbols 0, 1, and 2. SG2 consists of symbols 3, 4, and 5. SG3 consists of symbols 6, 7, and 8. SG4 consists of symbols 9, 10, and 11. The positions of the DMRSs are symbols 0, 3, 6, and 9, and the candidate starting positions are symbols 0, 3, 6, and 9 in the present embodiment.

Figure 2D:
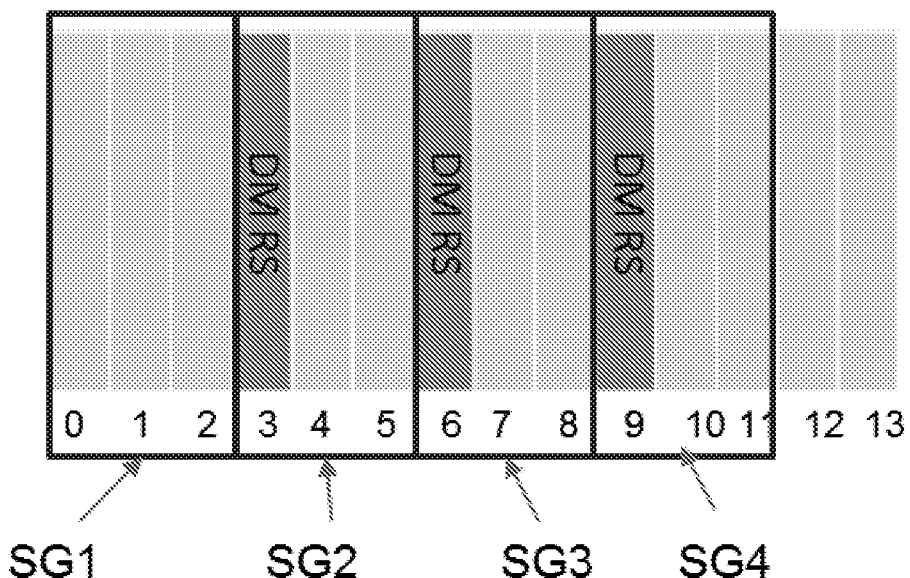

FIG. 2(d) shows three DMRSs configured for PUSCH mapping type A. Symbol 0 to symbol 11 for PUSCH are assigned for the uplink transmission and are divided into four SGs. For PUSCH mapping type A, the first DMRS position is either symbol 2 or 3 in the scheduled time slot indicated by the Master Information Block (MIB). In the present embodiment, SG1 consists of symbols 0, 1, and 2; SG2 consists of symbols 3, 4, and 5; SG3 consists of symbol 6, 7 and 8; and SG4 consists of symbol 9, 10, and 11. The positions of the DMRSs are symbols 3, 6, and 9. The candidate starting positions include symbol 0 and the symbol positions of the DMRS symbols. That is, the candidate starting positions are symbols 0, 3, 6, and 9.

In light of the above, the total number of SGs depends on the total number of DMRS symbols. For PUSCH mapping type B, the total number of SGs in the scheduled time slot equals to the total number of DMRS symbols; for PUSCH mapping type A, the total number of SGs in the scheduled time slot equals to the total number of DMRS symbols plus 1. If there is no additional DMRS (that is, there is only one DMRS), then only one symbol group is formed for PUSCH mapping type and only two symbol groups are formed for PUSCH mapping type A.

As mentioned above, in some embodiments of the present invention the number of candidate starting positions is dependent on the number of SGs. The symbol groups are determined based on locations of the DMRS(s). As a result, the candidate starting positions are known between the base station and the LIE after the DMRS is configured by RRC signaling and PUSCH transmission duration is indicated by uplink grant.

Figure 3A:
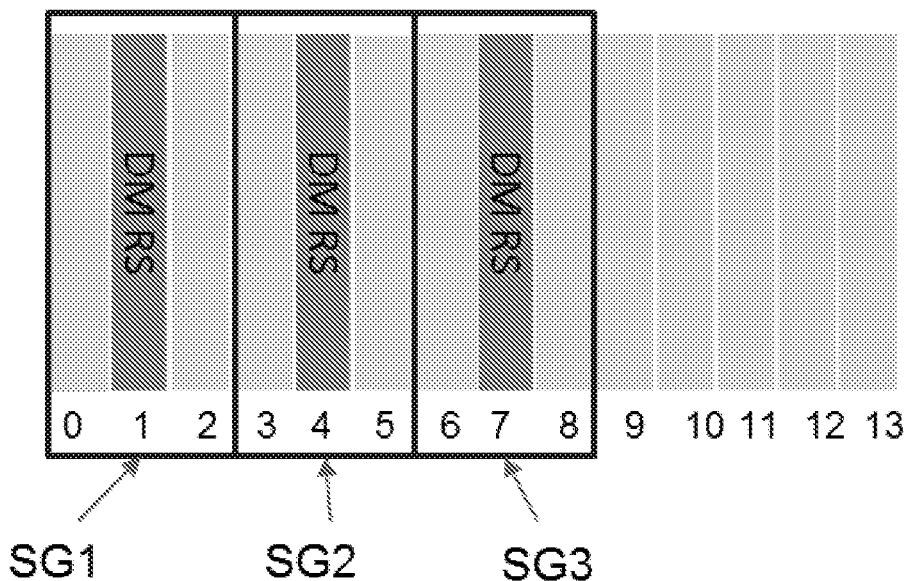
FIGS. 3(a) and 3(b) illustrate some other DMRS configurations according to the present disclosure.
Figure 3B:
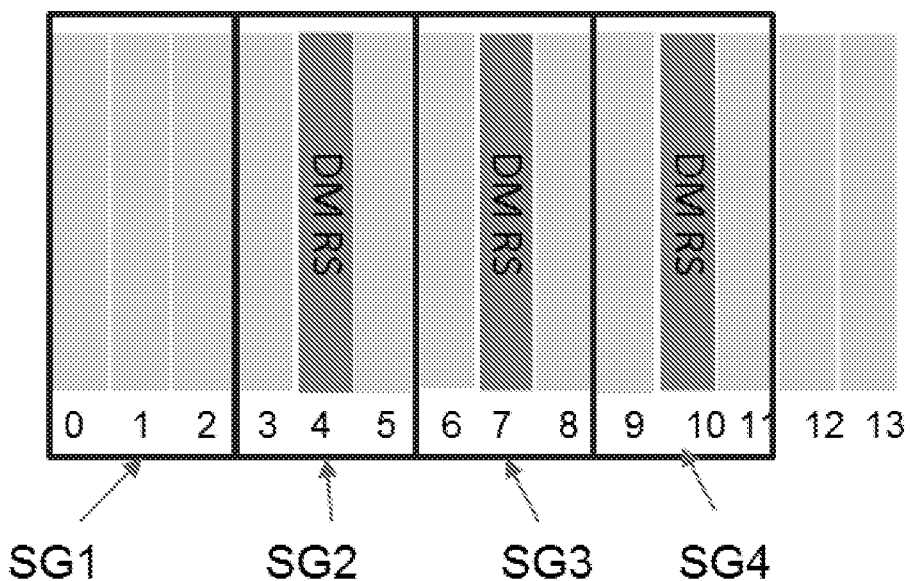

In some embodiments, the positions of the DMRS may also be in other symbols rather than the first symbol in the symbol group. As long as the UE and base station are both aware of the arrangement of the location of DMRS in a symbol group, the base station can determine the candidate starting positions for the uplink transmission in the scheduled time slot. FIGS. 3(a) and 3(b) depict some other DMRS configurations.

FIG. 3(a) shows three DMRSs configured for PUSCH mapping type B. In the present embodiment, the DMRS is determined to be a second symbol in a symbol group. Accordingly, SG1 consists of symbols 0, 1 and 2; SG2 consists of symbols 3, 4 and 5; and SG3 consists of symbols 6, 7 and 8. The positions of the candidate starting positions, e.g., the first symbol in each symbol group, are symbols 0, 3, and 6.

FIG. 3(b) shows three DMRSs configured for PUSCH mapping type A. Symbol 0 to symbol 11 for PUSCH are assigned for the uplink transmission. In the present embodiment, the DMRS is determined to be symbol 2 or 3. Accordingly, SG1 consists of symbols 0, 1 and 2; SG2 consists of symbols 3, 4 and 5; SG3 consists of symbols 6, 7 and 8; and SG4 consists of symbols 9, 10 and 11. The positions of the candidate starting positions, e.g., the first symbol in each symbol group, are symbols 0, 3, 6 and 9.

The UE may divide the uplink transmission into one or more code block groups (CBGs) and assign the one or more CBGs to a number of SGs. Each symbol group can only include an integral number of CBGs. Since the number of symbols included in one symbol group varies, one symbol group may include a different number of CBGs. The UE may use rate matching to align the CBG mapping.

In a preferred embodiment, upon reception of uplink grant, the UE prepares the uplink transmission according to the uplink grant. The UE divides the corresponding TB, with size determined by uplink grant, into several CBGs, calculates the number of CBGs, and maps a uniform number of CBGs to each symbol group. The maximum number of CBGs per TB is configured by RRC signaling. The aforementioned CBG construction is dependent on the RRC configured maximum CBG number per TB and the actual number of CBs of the TB.

In another embodiment, CB mapping is performed within each symbol group. Symbol group-based retransmission is specified. The number of HARQ-ACK bits can be equal to the number of symbol groups. Retransmission is dependent on the ACK or NACK corresponding to each symbol group. In a preferred embodiment, a bitmap with each bit corresponding to one symbol group is included in the uplink grant indicating whether a symbol group needs to be retransmitted or not.

Figure 4:
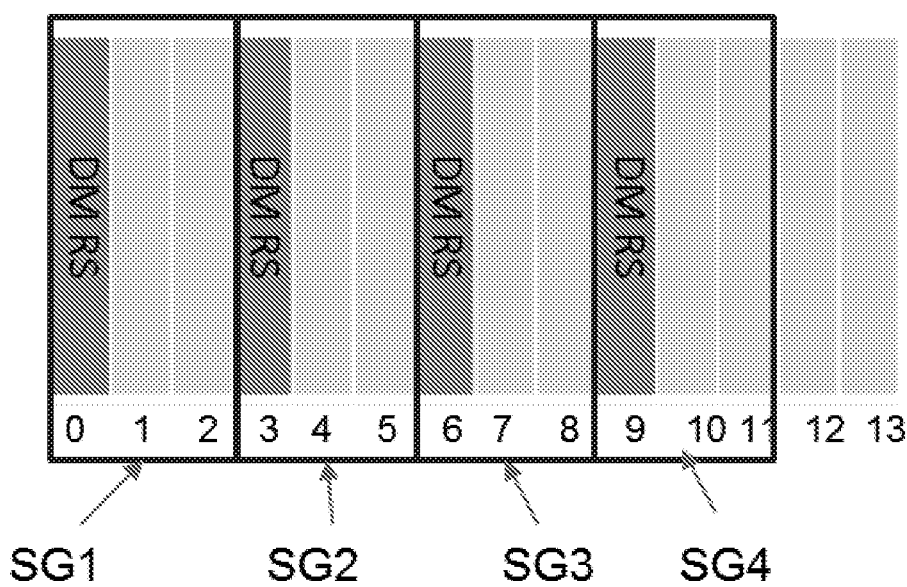
FIG. 4 illustrates a mapping manner for Uplink Control Information (UCI).

In some embodiments, the UE prepares the PUSCH transmission according to the uplink grant, and starts the PUSCH transmission from the next nearest candidate starting position, i.e., the actual starting position if the LBT is successful. In one embodiment, once the LBT is successful, the UE starts the uplink transmission from the actual starting position with the symbol group corresponding to the actual starting position and punctures the prepared symbol group(s) before the actual starting position. Take FIG. 4 as an example. The UE prepares data to be transmitted on symbols 0-11. If LBT for symbol 0 is failed and for symbol 3 is successful, then symbol 3 is the actual starting position. Then UE starts data transmission from SG2 and data prepared for symbols 0-2 in SG1 are punctured. The base station then receives the PUSCH and further determines which symbol groups are transmitted by detecting the DMRS in each symbol group. In another embodiment, once the LBT is successful, the UE starts the PUSCH transmission from the next nearest candidate starting position with the symbols in the data to be transmitted according to their numerical order. Take FIG. 4 as an example. The UE prepares data to be transmitted on symbols 0-11. If symbol 3 is the actual starting position, the UE transmits data prepared for symbol 0 on symbol 3; transmits data prepared for symbol 1 on symbol 4; . . . ; till the last assigned symbol. So, the last several symbol groups may not be transmitted. In this way, DMRS is always guaranteed within each symbol group so that the base station can not only receive the PUSCH but also estimate the UL channel based on the DMRS.

The punctured symbol group(s) of the PUSCH can be recovered by CBG-based retransmission. CBGTI (code block group transmission information) is carried in uplink grant for scheduling retransmission of those CBGs in the punctured symbol groups. In the NR, a Transport Block (TB) may include a plurality of Code Blocks (CB). The NR supports both TB-based retransmission and CBG-based retransmission. For TB-based retransmission, one Hybrid Automatic Repeat Request Acknowledge (HARQ-ACK) feedback bit corresponds to one TB. If one CB of a given TB is not correctly decoded at the receiver side, the receiver would report a Negative Acknowledgement (NACK) to the transmitter. In that case, the transmitter will have to retransmit the TB, which includes all the CBs. If one HARQ-ACK feedback bit corresponds to one CB, the transmitter can know whether a specific CB is correctly received and then retransmit only the failed CBs. In this way, retransmission efficiency can be improved. However, the HARQ-ACK feedback overhead may be huge.

In order to balance the number of needed HARQ-ACK feedback bits and the retransmission efficiency, the concept of CBG (code block group) is introduced in Radio Access Network Working Group 1 (RAN1). Basically, the purpose of this concept is to combine several code blocks into one code block group and the resulting HARQ-ACK feedback is generated per CBG. Only when all the code blocks within one CBG are correctly decoded, can the HARQ-ACK for the CBG be set to "ACK"; otherwise, it is set to "NACK". Upon receipt of the HARQ-ACK feedback, only the CBG(s) with "NACK" will be retransmitted by the transmitter.

For CBG-based retransmission; RRC signaling is used to configure the maximum number of CBGs per TB. The maximum number of CBGs per TB can be 2, 4, 6 or 8. For both a semi-static HARQ-ACK codebook and a dynamic HARQ-ACK codebook, the number of HARQ-ACK bits for one TB is equal to the configured maximum number of CBGs per TB, regardless of the variable TBS of a given TB.

CBG-based retransmission is also suitable for unlicensed spectrum. In particular, when incomplete PDSCH or PUSCH is transmitted in the initial partial slot after LBT is successful, CBG-based retransmission can be used to retransmit those CBGs punctured by the transmitter.

The present invention provides a simple solution to save CBG-based HARQ-ACK feedback overhead. A simple CBG-based retransmission mode can be configured by RRC signaling. In this simple mode, only the PUSCH in the initial slot is feedbacked with CBG-based HARQ-ACK feedback bits and PUSCH in the remaining slots of a UL burst is only feedbacked with TB-based HARQ-ACK feedback. In this way; CBG-based signaling overhead can be greatly reduced.

The UCI, which may include ACK/NACK for DL TBs and CSI, may be multiplexed within the uplink transmission, preferably be mapped in the last symbol group, since the last symbol group is the most likely to succeed the Channel Clear Assessment (CCA)/LBT within the slot. Within the symbol group, the UCI is mapped as close as possible to the DMRS symbol, i.e. frequency-first mapping. In the event that the last symbol group does not have sufficient capacity for the UCI, additional resources from the preceding symbol group are used for the UCI. For example, in FIG. 4, the UCI is carried in SG4, i.e., the last symbol group.

It should be noted that even though a contiguous resource allocation in frequency domain is shown in all the figures, the proposed solutions are also suitable for distributed resource allocation or interlace-based structure in frequency domain.

Meanwhile, the proposed symbol grouping and candidate starting positions based on DMRS positions are also suitable for downlink transmission. That is, the process performed by the UE would also be performed correspondingly by the base station.

Figure 5:
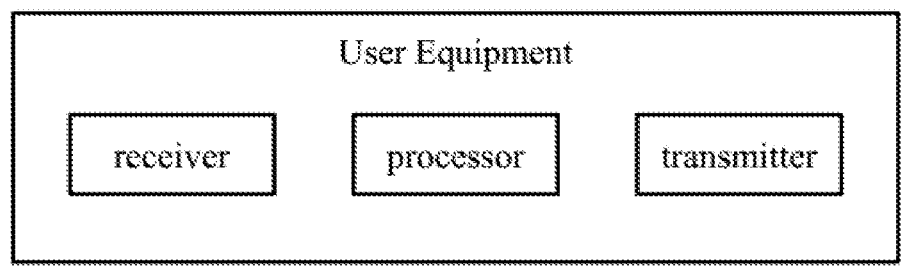
FIG. 5 illustrates an example block diagram of a User Equipment (UE) according to an embodiment of the present disclosure.

FIG. 5 depicts a block diagram of a UE according to the embodiments of the present disclosure. The UE 101 may include a receiver, a processor, and a transmitter. In certain embodiments, the UE 101 may further include an input device; a display; a memory, and/or other elements. In one embodiment, the receiver receives an uplink grant for scheduling uplink transmission; the processor determines, based on the uplink grant, at least one candidate starting position in a scheduled time slot for the uplink transmission, wherein a candidate starting position, among the at least one candidate starting position, is determined based on a location of a DMRS symbol, and also determines a starting position for the uplink transmission from the at least one candidate starting position based on a result of performing an LBT procedure on the scheduled time slot; and the transmitter starts the uplink transmission in the scheduled time slot from the determined starting position. The functions and implementations of all elements in the UE 101 and the definitions of related technical terms are disclosed in FIGS. 2 and 3 and the foregoing corresponding paragraphs in this specification.

Figure 6:
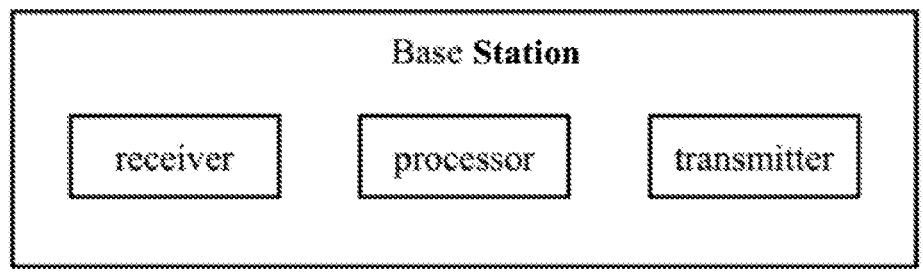
FIG. 6 illustrates an example block diagram of a base station according to an embodiment of the present disclosure.

FIG. 6 depicts a block diagram of a base station according to the embodiments of the present disclosure. The base station 102 may include a receiver, a processor, and a transmitter. In certain embodiments, the base station 102 may further include an input device, a display, a memory, and/or other elements. In one embodiment, the transmitter transmits an uplink grant for scheduling uplink transmission; the processor determines, based on the uplink grant, at least one candidate starting position in a scheduled time slot for the uplink transmission, wherein a candidate starting position, among the at least one candidate starting position, is determined based on a location of a Demodulation Reference Signal (DMRS) symbol, and also determines, in the scheduled time slot, a starting position of the uplink transmission from the at least one candidate starting position; and the receiver receives the uplink transmission in the scheduled time slot from the determined starting position.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit; a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE), comprising:
at least one memory; and
at least one processor coupled with the at least one memory and configured to cause the UE to:
receive an uplink grant that schedules a plurality of time slots for uplink transmission by indicating a time domain resource allocation pattern comprising non-consecutive symbols and a first assigned symbol;
determine, relative to the time domain resource allocation pattern and the first assigned symbol, a plurality of candidate starting positions in a scheduled time slot for the uplink transmission, wherein each candidate starting position among the plurality of candidate starting positions is determined using a predetermined mapping between the respective candidate starting position and a location of a demodulation reference signal (DMRS) symbol, each candidate starting position corresponds to a set of consecutive symbols, and two sets of consecutive symbols are separated by a DMRS symbol;
determine a starting position for the uplink transmission from the plurality of candidate starting positions based on a result of performing a listen before talk (LBT) procedure on the scheduled time slot; and
start the uplink transmission in the scheduled time slot from the determined starting position.

2. The UE of claim 1, wherein the at least one processor is configured to cause the UE to divide a plurality of symbols to be transmitted in the scheduled time slot into at least one symbol group, and a symbol group, among the at least one symbol group, includes a DMRS symbol as the first symbol in the symbol group.

3. The UE of claim 2, wherein a total number of the at least one symbol group in the scheduled time slot equals to a total number of DMRS symbols or equals to the total number of the DMRS symbols plus 1.

4. The UE of claim 2, wherein the uplink transmission is divided into at least one code block group (CBG), and each of the at least one symbol group includes an integral number of CBGs.

5. The UE of claim 4, wherein symbol group-based retransmission is adopted for the at least one symbol group and a bitmap with each bit corresponding to one symbol group is included in the uplink grant indicating whether a symbol group needs to be retransmitted or not.

6. The UE of claim 2, wherein the at least one processor is configured to cause the UE to start the uplink transmission from the determined starting position with the symbol group corresponding to the determined starting position, and one or more symbol groups preceding the determined starting position are punctured.

7. The UE of claim 2, wherein the at least one processor is configured to cause the UE to start the uplink transmission from the determined starting position with a first symbol group in the at least one symbol group, and one or more symbol groups failing to be transmitted in the scheduled time slot are punctured.

8. The UE of claim 1, wherein code block group (CBG)-based retransmission is adopted for a first time slot of the plurality of time slots, and transport block-based retransmission is adopted for the remaining time slots of the plurality of time slots.

9. The UE of claim 8, wherein the uplink grant includes a M-bit CBG transmission information only for the first time slot of the plurality of time slots, wherein M is a configured maximum number of CBGs per transport block.

10. The UE of claim 2, wherein the at least one processor is configured to cause the UE to transmit uplink control information (UCI) in the uplink transmission, wherein the UCI is carried in the last symbol group of the at least one symbol group.

11. A base station, comprising:
at least one memory; and
at least one processor coupled with the at least one memory and configured to cause the base station to:
transmit an uplink grant that schedules a plurality of time slots for uplink transmission by indicating a time domain resource allocation pattern comprising non-consecutive symbols and a first assigned symbol;
determine, relative to the time domain resource allocation pattern and the first assigned symbol, a plurality of candidate starting positions in a scheduled time slot for the uplink transmission, wherein each candidate starting position among the plurality of candidate starting positions is determined using a predetermined mapping between the respective candidate starting position and a location of a demodulation reference signal (DMRS) symbol, each candidate starting position corresponds to a set of consecutive symbols, and two sets of consecutive symbols are separated by a DMRS symbol;
determine, in the scheduled time slot, a starting position of the uplink transmission from the plurality of candidate starting positions; and
receive the uplink transmission in the scheduled time slot from the determined starting position.

12. The base station of claim 11, wherein the uplink transmission on a plurality of symbols in the scheduled time slot are divided into at least one symbol group, and a symbol group, among the at least one symbol group, includes a DMRS symbol as the first symbol in the symbol group.

13. The base station of claim 12, wherein a total number of the at least one symbol group in the scheduled time slot equals to a total number of DMRS symbols or equals to the total number of the DMRS symbols plus 1.

14. The base station of claim 12, wherein the uplink transmission is divided into at least one code block group (CBG), and each of the at least one symbol group includes an integral number of CBGs.

15. The base station of claim 14, wherein symbol group-based retransmission is adopted for the at least one symbol group and a bitmap with each bit corresponding to one symbol group is included in the uplink grant indicating whether a symbol group needs to be retransmitted or not.

16. The base station of claim 11, wherein code block group (CBG)-based retransmission is adopted for a first time slot of the plurality of time slots, and transport block-based retransmission is adopted for the remaining time slots of the plurality of time slots.

17. The base station of claim 16, wherein the uplink grant includes a M-bit CBG transmission information only for the first time slot of the plurality of time slots, wherein M is a configured maximum number of CBGs per transport block.

18. The base station of claim 12, wherein the at least one processor is configured to cause the base station to receive uplink control information (UCI) in the uplink transmission, wherein the UCI is carried in the last symbol group of the at least one symbol group.

19. A method performed by a user equipment (UE), the method comprising:
receiving an uplink grant that schedules a plurality of time slots for uplink transmission by indicating a time domain resource allocation pattern comprising non-consecutive symbols and a first assigned symbol;
determining, relative to the time domain resource allocation pattern and the first assigned symbol, a plurality of candidate starting positions in a scheduled time slot for the uplink transmission, wherein each candidate starting position among the plurality of candidate starting positions is determined using a predetermined mapping between the respective candidate starting position and a location of a demodulation reference signal (DMRS) symbol, each candidate starting position corresponds to a set of consecutive symbols, and two sets of consecutive symbols are separated by a DMRS symbol;
determining a starting position for the uplink transmission from the plurality of candidate starting positions based on a result of performing a listen before talk (LBT) procedure on the scheduled time slot; and
starting the uplink transmission in the scheduled time slot from the determined starting position.

20. A method performed by a base station, the method comprising:
transmitting an uplink grant that schedules a plurality of time slots for uplink transmission by indicating a time domain resource allocation pattern comprising non-consecutive symbols and a first assigned symbol;
determining, relative to the time domain resource allocation pattern and the first assigned symbol, a plurality of candidate starting positions in a scheduled time slot for the uplink transmission, wherein each candidate starting position among the plurality of candidate starting positions is determined using a predetermined mapping between the respective candidate starting position and a location of a demodulation reference signal (DMRS) symbol, each candidate starting position corresponds to a set of consecutive symbols, and two sets of consecutive symbols are separated by a DMRS symbol;
determining, in the scheduled time slot, a starting position of the uplink transmission from the plurality of candidate starting positions; and
receiving the uplink transmission in the scheduled time slot from the determined starting position.

\* \* \* \* \*